(No Model.)
W. C. HODNETT & J. D. WAGGONER.
COTTON ELEVATOR.
No. 466,685. Patented Jan. 5, 1892.
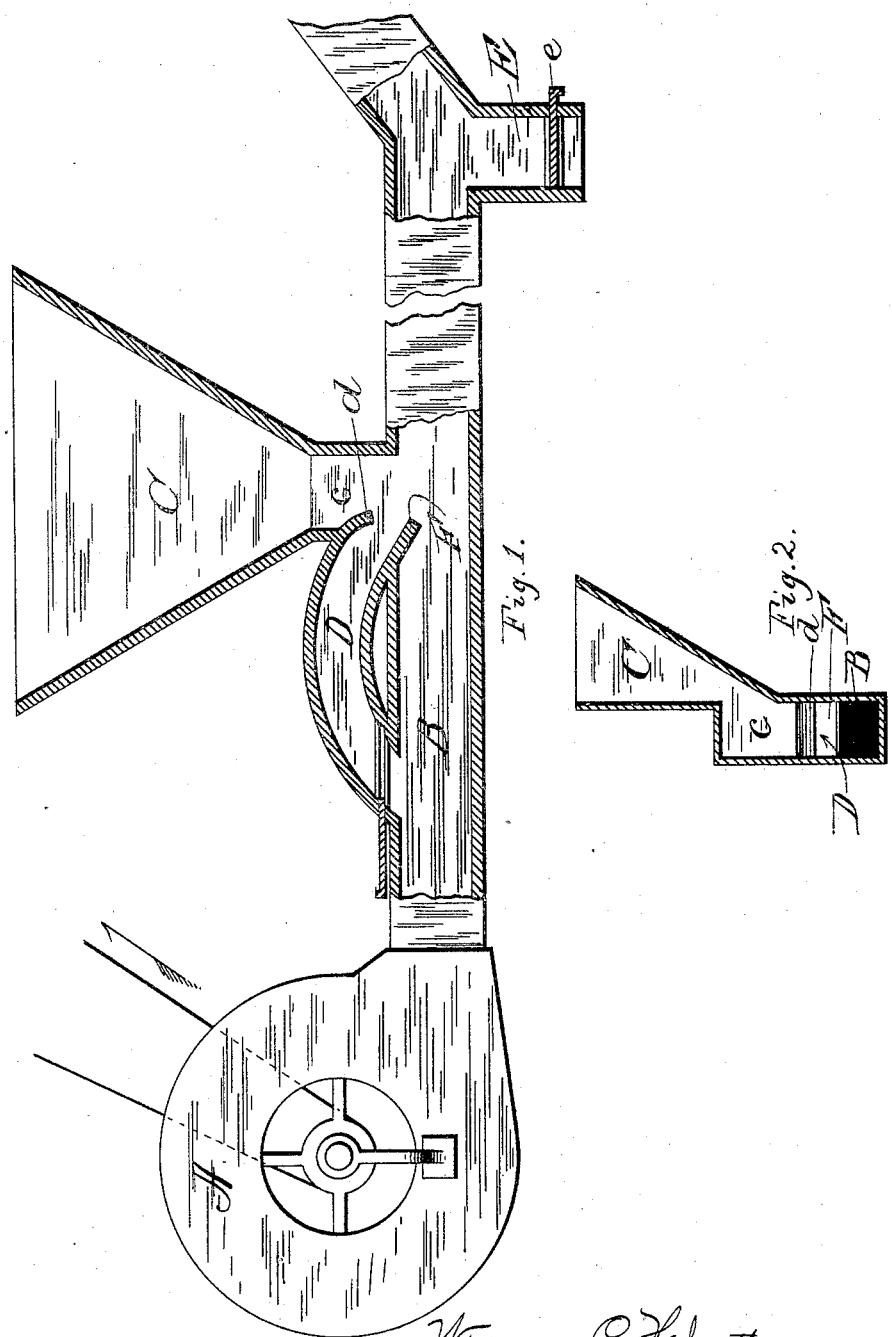
Witnesses
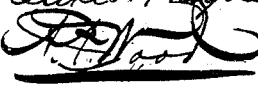

UNITED STATES PATENT OFFICE.

WILLIAM C. HODNETT, OF DOUGLASVILLE, AND JAMES D. WAGGONER, OF LONE OAK, GEORGIA; SAID WAGGONER ASSIGNOR TO SAID HODNETT.

COTTON-ELEVATOR.

SPECIFICATION forming part of Letters Patent No. 466,685, dated January 5, 1892.

Application filed June 17, 1890. Renewed November 17, 1891. Serial No. 412,237. (No model.)

*To all whom it may concern:*

Be it known that we, WILLIAM C. HODNETT, of Douglasville, in the county of Douglas and State of Georgia, and JAMES D. WAGGONER, of Lone Oak, in the county of Meriwether and State of Georgia, have invented certain new and useful Improvements in Cotton-Elevators; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to devices for elevating and cleaning seed-cotton or other substances, the object being to perform these functions without the necessity of passing material through the blast-fan, which is of great advantage, especially in handling seed-cotton, which is liable to be matted and torn by the action of the revolving fan or ignited by the forcible contact of the fan-wings and stones in the cotton, the invention consisting of means whereby the cotton is introduced and forced into the flue and carried by the blast to the desired position, the sand, stones, and other foreign elements being eliminated in transit and held until disposed of without passing any part of the same through machinery of any kind, the details of all of which being hereinafter fully described and claimed.

In the accompanying drawings, Figure 1 illustrates the invention in side elevation, a central longitudinal cut being made to show the construction of hopper, flues, &c. Fig. 2 is a detail of the hopper in cross-section vertically cut.

In the figures like reference-marks indicate corresponding parts in the several views.

The blower A may be of any desired pattern and has suitably connected to its outlet-opening a flue B, square or round in form and of suitable material. This flue extends from the said blower to the position where it is desired to deposit the material. In the case of seed-cotton the blower would probably be near the ground, in order that the cotton might be thrown into the hopper C from a wagon, while the outlet opening or openings would register with the cotton-bins in the gin-house, in order that the cotton might be distributed therein. At a suitable position intermediate with the flue B is a hopper C for the purpose of storage and introduction into the flue of the material to be transmitted. This hopper C is of the form substantially as shown in cross-section in Fig. 2, in which a chamber $c$ is formed opening into the flue B, as best shown in Fig. 1, into the side of which chamber $c$ enters the said hopper, said chamber $c$ providing for the cotton to expand and be circulated by the air-blast on being drawn from the hopper, thoroughly breaking up matted locks and loosening dirt, dust, stems, leaves, and other foreign matter from the cotton, which will be further loosened and eliminated by the further action of the device, some suitable means being provided, if desired, and allowing the dirt, &c., to proceed beyond the cotton-bin or gin-feeder. Usually, however, the same will be blown farther than the cotton, and suitable outlet-openings in the gin-house for dust may be prepared. In order that the blast may not pass upwardly through this hopper C, the flue B is suitably restricted between the fan and the opening into the chamber $c$ of the hopper C and the said flue divided between the fan and the said point of restriction, and the blast so taken from the main flue by the flue D is carried to the base of the hopper, where the line of its direction will approximately bisect the angle formed by the incidence of the line of motion of the blast in the flue B and of the cotton or other material descending into said flue B from the hopper C. The blast coming through the flue D and striking against the blast in the flue B will force it downwardly past the hopper-opening, and by reason of its angle in striking the incoming cotton will force the same downwardly into the flue B, the two air-currents there coming together and forcing the cotton forward and over the receptacle E, into which will fall the heavy foreign substances previously loosened by the action of the blast.

The forward end of the flue D is slightly restricted and the direction of the air affected by the lip $d$, and the tension of said current is governed by the gate G, by means of which said air-current may be totally stopped when it is not desired to use the hopper C, which would be especially useful in case said hopper was but one of a series on the flue B. The flue B is restricted by the lip F, which may be adjustable, if desired, both as to inclination governing the downward deflection of the current and as to projection governing the area of opening at that point in the flue. Near the bottom of the inclination of the flue B is a chamber E, having a removable bottom e. This chamber is just deep enough to hold the necessary amount of foreign matter and shallow enough for the blast to lift locks of cotton therefrom to prevent any waste, and it is situated at the base of the incline, in order that any heavy substance which shall stop on the said incline may descend into said chamber and not obstruct the flue B. By a withdrawal of the sliding bottom e the refuse will be discharged from the said chamber.

Having thus described our invention, what we claim as new, and desire to secure by Letters Patent, is—

1. In a device of the class specified, the combination of a flue and hopper C, opening thereinto, and a flue D, opening into the flue B, substantially as specified, near the point of entrance of the hopper C, and means for causing a forcible current of air in flues B and D, substantially as shown and described.

2. In a device of the class specified, the fan A, flues B and D, the hopper C, and the lip F, arranged to obstruct the said flue B and to govern the direction of the blast at that point therein, substantially as specified.

3. In a device of the class specified, the fan A, flue B, having a charging-opening therein, the flue D, having a lip $d$ and opening into the flue B near the charging-opening, and means for producing an air-blast in said flues, substantially as shown and described, and for the purpose specified.

In testimony whereof we hereunto set our hands in presence of two witnesses.

WILLIAM C. HODNETT.
JAMES D. WAGGONER.

Witnesses as to the signature of the said Hodnett:
   H. T. COOPER,
   J. A. PITTMAN.

Witnesses as to the signature of the said Waggoner:
   W. P. SEWELL,
   R. P. ROSSER.